(12) United States Patent
Walldeen et al.

(10) Patent No.: US 8,023,449 B2
(45) Date of Patent: Sep. 20, 2011

(54) METHOD OF DATA PRESERVATION AND MINIMIZING REDUCTION IN DATA THROUGHPUT IN THE EVENT OF A CELL CHANGE

(75) Inventors: Thomas Walldeen, Linköping (SE); Sandra Collins, Dublin (IE); Erik Westerberg, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 890 days.

(21) Appl. No.: 10/512,837

(22) PCT Filed: May 23, 2002

(86) PCT No.: PCT/EP02/05673
§ 371 (c)(1),
(2), (4) Date: May 27, 2005

(87) PCT Pub. No.: WO03/101137
PCT Pub. Date: Dec. 4, 2003

(65) Prior Publication Data
US 2005/0237976 A1    Oct. 27, 2005

(51) Int. Cl.
*H04W 4/00*    (2009.01)
(52) U.S. Cl. ..... 370/328; 370/338; 370/331; 370/310.2; 455/422.1; 455/460
(58) Field of Classification Search .......... 370/328–338, 370/310.2; 455/422.1–460
See application file for complete search history.

(56) References Cited

U.S. PATENT DOCUMENTS

| 5,896,373 | A | 4/1999 | Immonen et al. |
| 5,940,371 | A * | 8/1999 | Mitts et al. ..................... 370/236 |
| 6,438,117 | B1 * | 8/2002 | Grilli et al. ..................... 370/331 |
| 6,904,025 | B1 * | 6/2005 | Madour et al. ................ 370/328 |
| 2002/0080758 | A1 * | 6/2002 | Landais .......................... 370/338 |
| 2003/0067897 | A1 * | 4/2003 | Black ............................. 370/335 |

FOREIGN PATENT DOCUMENTS
GB    2 367 719 A    4/2002
WO    98/03030 A1    1/1998

OTHER PUBLICATIONS

European Action dated Nov. 14, 2007 (4 pages).
European Action dated Mar. 1, 2006 (2 pages).
Mitts et al, "Lossless Handover for Wireless ATM", Journal of Special Topics in Mobile Networks and Applications, Beltzer Science Publishers, Amsterdam, NL, vol. 1, No. 3, Dec. 1996, pp. 299-312.

* cited by examiner

*Primary Examiner* — Kamran Afshar
*Assistant Examiner* — Sayed T Zewari
(74) *Attorney, Agent, or Firm* — Nixon & Vanderhye P.C.

(57) ABSTRACT

A method ensures that a reduction in data throughput is minimized in the event of a cell change in a GPRS network. When it is determined that cell change is appropriate for a mobile station, the BSS ensures that no further data for the mobile station is transmitted form the SGSN, and then continues to transmit all buffered data to the mobile station. The throughput may be deliberately reduced for a part of this time, so that the system timers become adapted to the reduction in throughput which will occur at the cell change. When the buffer has been emptied, the cell change is effected and, thereafter, that mobile station is prioritised in the BSS, in order to allow any buffered data on the uplink or downlink to be cleared.

26 Claims, 2 Drawing Sheets

METHOD OF DATA PRESERVATION AND MINIMIZING REDUCTION IN DATA THROUGHPUT IN THE EVENT OF A CELL CHANGE

This application is the U.S. national phase of international application PCT/EP02/05673 filed 23 May 2003 which designated the U.S., the entire content of which is hereby incorporated by reference.

TECHNICAL FIELD OF THE INVENTION

The technology relates to a mobile communications network, and in particular to a method for compensating for a decrease in the rate of data transfer, which usually occurs when a mobile device moves between different cells in a cellular system.

BACKGROUND OF THE INVENTION

In a known General Packet Radio Service (GPRS) mobile communications network, a Gateway GPRS Support Node (GGSN) acts as a gateway to and from an Internet Service Provider (ISP), and has a connection to a general data communications network. Connected to the GGSN is a Serving GPRS Support Node (SGSN), which is further connected to multiple Base Station Systems (BSS).

A mobile station (MS), which is active within the network, has a connection to one BSS, and the SGSN handles the routing of data from the GGSN to the BSS.

Each BSS has at least one Packet Control Unit (PCU), which handles the different GPRS users, and schedules data on the radio resources which are available for GPRS users in the cell.

When downlink data is transmitted to an MS in a GPRS network, the data is buffered, in the form of Logical Link Control (LLC) Packet Data Units (PDU) both in the SGSN and in the BSS. The LLC is the protocol which provides a logical link between the MS and the SGSN.

When a Mobile Station moves in the area covered by the network, procedures are provided to control the way in which its connection changes from one cell to another.

The BSS specifies a Network Control (NC) mode, and broadcasts this to the Mobile Station on control channels. In Network Control mode 0 (NC0) or Network Control mode 1 (NC1), the MS may perform cell reselection autonomously, as described in the 3rd Generation Partnership Project Technical Specification 3GPP TS 44.060 V5.0.0, section 5.5.1.1. Thus, the MS measures the signal strengths of neighbouring cells and, when it determines that a cell change is appropriate, it performs the cell change. The BSS determines that the MS has changed cell only when it receives a Cell Update message from the MS in the new cell.

In Network Control mode 2 (NC2), the cell reselection is initiated by the network, as described in the 3rd Generation Partnership Project Technical Specification 3GPP TS 44.060 V5.0.0, section 8.4. Thus, the MS measures the signal strengths of the serving cell and of neighbouring cells, and sends measurement reports to the BSS. When the BSS determines that a cell change is appropriate, it directs the MS accordingly.

A cell change, as described above, whether performed autonomously by the MS or initiated by the BSS, typically takes 3-5 seconds, during which time data transfer is interrupted.

If it is supported by the MS, the functionality Network Assisted Cell Change, as described in the 3rd Generation Partnership Project Technical Specification 3GPP TS 44.060 V5.0.0, sections 5.51.1a and 8.8, can reduce this interruption to less than 1 second. In this case, when the MS determines that a cell change is appropriate, it sends a Packet Cell Chance Notification message to the BSS. The BSS responds with the system information for the proposed cell reselection, thereby allowing the MS to make a faster access in the new cell.

However, there remains an interruption, during which there is no data transfer. Further, the interruption may lead to timeouts and/or reduced data throughput in higher layer protocols.

Moreover, when an SGSN detects a cell change, it sends a FLUSH-LL PDU message to the old BSS, as described in the 3rd Generation Partnership Project Technical Specification 3GPP TS 08.18 V8.9.0, section 8.1. In some cases, this will allow buffered data, awaiting transmission to the MS, to be transferred to the PCU for the new cell. However, in other cases, particularly in the case of a cell change between routing areas or between Network Service Entities, the buffered data cannot be transferred, and must be retransmitted at a higher layer protocol. Again, this can lead to reduced data throughput for the MS.

SUMMARY OF THE INVENTION

According to a first aspect of the technology, there is provided a method which allows data throughput to be maintained in the event of a cell change. The method comprises delaying a cell change, and continuing to transfer data from a radio access node to the mobile station until all buffered data has been transferred, while preventing further data from being sent from a core network node to the radio access node. The proposed cell change is then performed when all buffered data has been sent.

This has the advantage that data transfer interruption, and/or the need for higher layer retransmissions, are minimized.

More specifically, the serving radio access node determines that a cell change is required, for example on the basis of measurement reports sent from the mobile station or on the basis of a cell change notification sent from the mobile station, sends a message to the core network node instructing the core network node not to send further data intended for the mobile station, while continuing to transmit buffered data to the mobile station, and, when the buffered data has been transmitted to the mobile station, sends a message to the mobile station instructing the cell change.

In particular, if the radio access node receives a cell change notification from the mobile station, it sends a message to the mobile station delaying the cell change.

Preferably, the data transferred from the radio access node to the mobile station are transferred with a reduced data throughput in a period before the cell change. This allows the higher layer protocol timers to adapt to a reduced data throughput before the cell change. The reduced data rate can for example be achieved by transferring data at a reduced data rate, or by transferring data with a more robust coding scheme.

Alternatively, or additionally, a portion of a higher layer protocol data can be omitted from the data transferred from the radio access node to the mobile station.

In accordance with another aspect of the technology, after the cell change, the mobile station is prioritised for data transfer with the core network node. This has the advantage that, if large amounts of data have been buffered for the mobile station in the core network node (or vice versa) during the cell change, this backlog of data can be cleared more quickly.

In one or more embodiments, the network is a GPRS network, the radio access node is a Base Station System (BSS), and the core network node is a SGSN.

In the case of a GPRS network, cell changes in which data are deleted at a radio access node are usually inter-Routing Area or inter-Network Service Entity cell changes. A Routing Area may be defined to be equivalent to a Base Station System (BSS) or a Radio Access Network (RAN), and a Network Service Entity may be defined to be equivalent to a BSS, but this is not required.

DETAILED DESCRIPTION OF PREFERRED EMBODIMENTS

Figure 1:
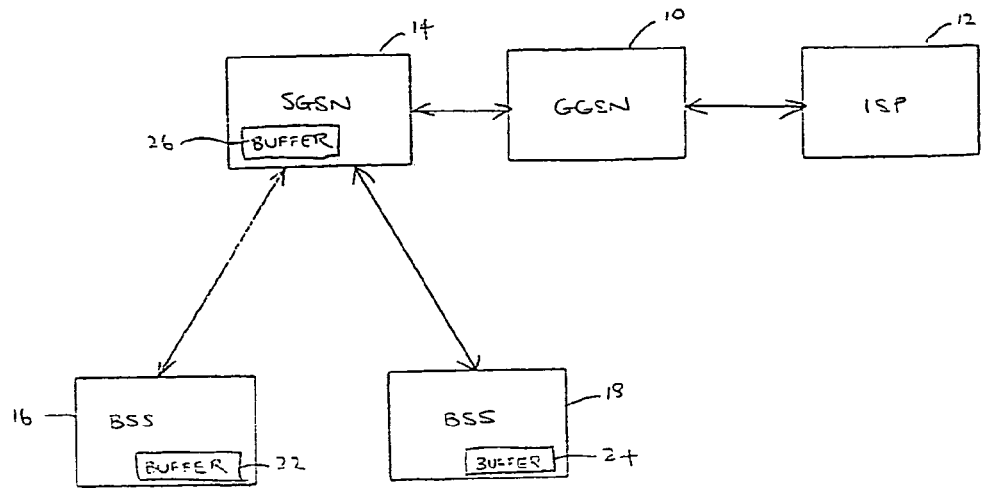
FIG. 1 is a schematic representation of a mobile communications network in accordance with an embodiment.
Figure 1:
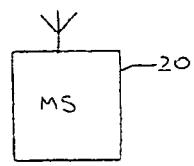

FIG. 1 is a schematic representation of a part of a General Packet Radio Service (GPRS) mobile communications network, for example operating in accordance with the standards set by the 3rd Generation Partnership Project. The embodiment is described herein with reference to this access technology, although it will be appreciated that it is equally applicable to other access technologies.

The network includes at least one Gateway GPRS Support Node (GGSN) 10, which is the gateway to a general data communications network (not shown), for example through an Internet Service Provider (ISP) 12. Each GGSN 10 is connected to one or more Serving GPRS Support Nodes (SGSN) 14, of which only one is shown in FIG. 1.

Each SGSN is connected to a plurality of Base Station Systems (BSSs) 16, 18. It will be apparent to the person skilled in the art that a real network will include more SGSNs and BSSs than the small number illustrated in FIG. 1. However, description of those additional nodes is not required for an understanding of the embodiment.

Each BSS 16, 18 is in radio communication with any Mobile Stations (MS) which are active within their respective cells. For example, FIG. 1 shows a first MS 20, having a connection over the air interface to the BSS 16. Again, it will be apparent that the network can provide service to many more such Mobile Stations.

When transmitting data to an MS 20 in a GPRS network, the data is buffered in a buffer 26 in the SGSN, and in a buffer 22, 24 in the respective BSS.

A Routing Area (RA) is a collection of cells, which may be equivalent to the cells served by one Base Station System, or may be a subset of the cells served by a Base Station System, or may be a collection of cells served by more than one Base Station System. A Network Service Entity (NSE) is a logical entity located in the Base Station System or in the SGSN. One Network Service Entity in the Base Station System communicates with one Network Service Entity In the SGSN (In a one-to-one relationship) One or more Network Service Entities may be defined per Base Station System. Similarly one or more Network Service Entities may be defined per SGSN. A Network Service Entity cannot comprise more than one Base Station System, or more than one SGSN.

Figure 2:
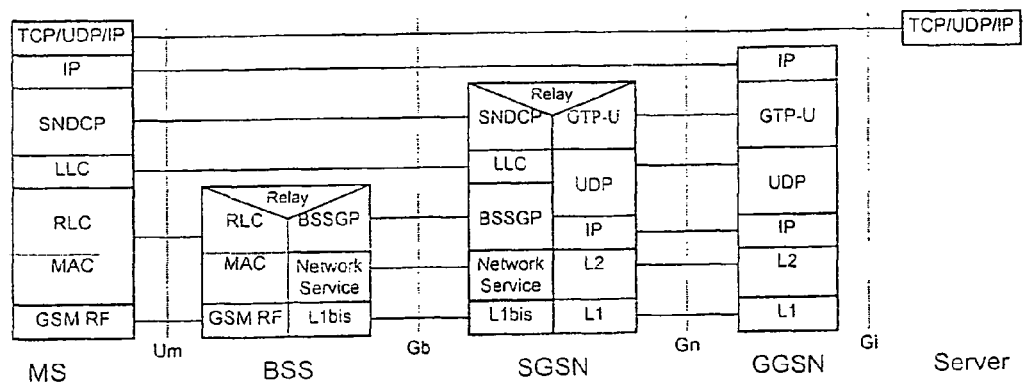
FIG. 2 illustrates the data transmission protocols in use in a part of the network shown in FIG. 1.

FIG. 2 illustrates the protocol stacks which are in use between the Mobile Station MS and Base Station System BSS on the air interface (or Um interface) between the BSS and the SGSN on the Gb interface, between the MS and the GGSN, and between the MS and a server in the ISP. The protocol stack is generally conventional. It will therefore not be described further herein, but is provided only to illustrate the protocols used in the present invention, in particular the Logical Link Control (LLC), which provides a logical link between the MS and SGSN; the BSS GPRS Protocol (BSSGP), which is used between the BSS and SGSN; and the higher layer protocols, such as TCP, UDP or IP, which may be in use between the MS and a server in the ISP.

The type of data that is buffered in the SGSN and in the BSS is in the form of Logical Link Control (LLC) Packet Data Units (PDUs).

Figure 3:
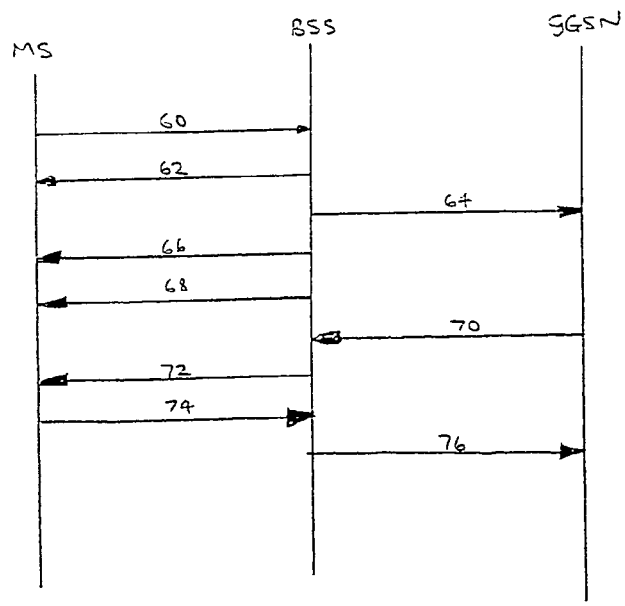
FIG. 3 illustrates a method in accordance with an embodiment.

FIG. 3 illustrates the sequence of messages sent in a method according an embodiment, between a mobile station (MS), a radio access node in the form of a GPRS BSS, and a core network node in the form of a GPRS SGSN.

The sequence illustrated in FIG. 3 assumes that the MS and BSS support Network Control mode 2 (NC2), but that the MS is initially operating in Network Control mode 0 or 1 (NC0 or NC1), and that the MS and BSS also support the Network Assisted Cell Change functionality.

The sequence begins in this illustrated embodiment with a Packet Cell Change Notification message 60, sent from the MS to the BSS, indicating a cell reselection.

The BSS replies with a message 62, which directs the MS into Network Control mode 2.

Although the sequence illustrated in FIG. 3 assumes that the MS is initially operating in Network Control mode 0 or 1, the following steps can however also be taken if the MS is initially operating in Network Control mode 2, following a determination by the BSS that a cell change is appropriate for the MS.

The procedure is described herein with reference to a cell change within one BSS, and is particularly useful in the case of a cell change in which data is discarded or would otherwise need to be retransmitted. For example, this can occur in the case of a GPRS cell change between routing areas or between Network Service Entities, or in the case of a cell change from GPRS to Universal Mobile Telecommunications System (UMTS), or in the case of a cell change from GPRS to a Wireless Local Area Network (W-LAN)

The BSS sends a Flow Control message 64 to the SGSN, instructing it to send no more data for this MS. This allows the BSS to empty its buffer for the MS, as further described below, but may mean that a large amount of data is buffered for the MS in the SGSN.

As shown by message 66 in FIG. 3, the BSS continues to transfer data to the MS in the first cell, until the PCU buffer 22 is emptied for the MS, and all of the data has been successfully received and acknowledged. While transferring this data, the BSS takes steps to reduce the data throughput. The data being sent from the BSS to the MS at this time is advantageously transferred with a more robust coding scheme or modulation-coding scheme. This generally reduces the data throughput, but should also ensure that the cell change is completed as quickly as possible, by avoiding the need for data retransmissions as far as possible. Alternatively, or additionally, the data rate may be deliberately decreased for a period (e.g. 0.5-2 seconds) before the cell change is effected. This allows the timers on the higher layer protocol to become adapted to the reduced throughput.

A similar effect can be achieved, for example if TCP or another similar protocol is the higher layer protocol in use, by deliberately removing the oldest TCP segment from the PCU buffer 22, while continuing to transmit data at the maximum rate appropriate to the radio conditions. When the sender receives an acknowledgement indicating the missing segment, which will occur only after the BSS has polled the MS for a sufficiently long time, this forces the TCP protocol into a congestion avoidance mechanism. This mechanism allows the higher layer protocol to become adapted to the reduced throughput which will be available, before the cell change is effected. This technique can be applied selectively. For example, it may be applied if TCP is the higher layer protocol in use, but not for UDP services, since UDP does not become adapted in this way to the operating conditions.

When the PCU buffer 22 in the BSS has been emptied for this MS, the BSS sends a message 68 to the MS, directing it to change to the cell proposed in the Packet Cell Change Notification message, or to the most appropriate cell. This message, or another message sent from the BSS to the MS, may then also release the MS from Network Control mode 2.

After the cell change has been effected, there may be a large amount of data for the MS buffered in the SGSN 14, as mentioned earlier. Moreover, there may be timers running in the higher layer protocols. Therefore, in order to allow these buffers to be emptied, and to reduce the possibility of timeouts in the higher layer protocols, the MS 20 is given a higher priority in the BSS than other MSs. Downlink data transmission from the SGSN to the BSS (in message 70), and onwards from the BSS to the MS in the new cell (in message 72) can then be resumed. Similarly, uplink data transmission from the MS to the BSS (in message 74), and onwards from the BSS to the SGSN (in message 76) can also be resumed.

In addition to the advantages mentioned above, prioritizing the MS in the BSS can also speed uD any necessary retransmissions in the higher protocol layers, and can assist in higher layer protocol recovery mechanisms such as TCP Slow Start, both on the downlink and the uplink.

It should also be noted that this prioritisation after a cell change is advantageous even without the other steps described above, and irrespective of whether the MS supports Network Assisted Cell Change and of the Network Control mode.

The embodiment therefore minimizes the effect of a cell change on the data throughput, in particular in cases where the cell change would otherwise involve discarding or retransmitting data.

The invention claimed is:

1. A method of controlling a cell change in a mobile communications network, in which data is transmitted from a core network node to a radio access node for transmission to a mobile station, and in which data is buffered in the radio access node before transmission to the mobile station, the method comprising:
   determining in the radio access node that the cell change from a first cell to a second cell is required the radio access node being associated with the first cell;
   sending a message from the radio access node to the core network node, instructing the core network node not to send further data intended for the mobile station;
   continuing to transmit the buffered data from the radio access node to the mobile station; and
   when the buffered data has been transmitted from the radio access node to the mobile station, sending a message from the radio access node to the mobile station instructing the cell change from the first cell to the second cell.

2. A method as claimed in claim 1, wherein the step of continuing to transmit the buffered data comprises transmitting at least a part of the buffered data from the radio access node to the mobile station at a reduced data rate.

3. A method as claimed in claim 1, wherein the step of continuing to transmit the buffered data comprises transmitting at least a part of the buffered data from the radio access node to the mobile station with a more robust coding scheme than previous transmissions.

4. A method as claimed in claim 1, wherein the step of determining in the radio access node that the cell change is required comprises determining based on measurement reports sent from the mobile station.

5. A method as claimed in claim 1, wherein the step of determining in the radio access node that the cell change is required comprises determining based on a cell change notification sent from the mobile station.

6. A method as claimed in claim 5, further comprising, in response to the cell change notification sent from the mobile station, sending a message from the radio access node to the mobile station delaying the cell change.

7. A method as claimed in claim 1, further comprising, after effecting the cell change from the first cell to the second cell, in a radio access node associated with the second cell, prioritizing the mobile station relative to other mobile stations in respect of transmissions between the radio access node and said mobile station.

8. A method as claimed in claim 1, for use in a GPRS network, wherein the core network node is a SGSN, and the radio access node is a BSS.

9. A method as claimed in claim 5, for use in a GPRS network, wherein the core network node is a SGSN, the radio access node is a BSS, and the cell change notification is a Packet Cell Change Notification message.

10. A method as claimed in claim 6, for use in a GPRS network, wherein the core network node is a SGSN, the radio access node is a BSS, the cell change notification is a Packet Cell Change Notification message, and the message sent from the radio access node to the mobile station delaying the cell change directs the mobile station to enter Network Control mode 2.

11. A radio access node, for connection to a core network node in a mobile communications network, the radio access node comprising means for buffering data packets before transmission to a mobile station, the radio access node further comprising:
   means for determining that a cell change from a first cell to a second cell is required, the radio access node being associated with the first cell;
   means for sending a message to the core network node, in response to the determination that the cell change is required, instructing the core network node not to send further data intended for the mobile station;
   means for continuing to transmit the buffered data from the radio access node to the mobile station; and
   means for sending a message from the radio access node to the mobile station instructing the cell change from the first cell to the second cell when the buffered data from the radio access node has been transmitted to the mobile station.

12. A radio access node as claimed in claim 11, adapted to transmit at least a part of the buffered data to the mobile station at a reduced data rate in response to the determination that the cell change is required.

13. A radio access node as claimed in claim 11, adapted to transmit at least a part of the buffered data to the mobile station with a more robust coding scheme than previous transmissions in response to the determination that the cell change is required.

14. A radio access node as claimed in claim 11, wherein the means for determining that the cell change is required makes said determination based on measurement reports sent from the mobile station.

15. A radio access node as claimed in claim 11, wherein the means for determining that the cell change is required makes said determination based on a cell change notification sent from the mobile station.

16. A radio access node as claimed in claim 15, further comprising means for sending a message from the radio access node to the mobile station delaying the cell change, in response to the cell change notification sent from the mobile station.

17. A radio access node as claimed in claim 11, further comprising means for, after effecting the cell change from the first cell to the second cell, prioritizing the mobile station relative to other mobile stations in respect of transmissions between the radio access node and said mobile station.

18. A radio access node as claimed in claim 11, for use in a GPRS network, wherein the radio access node is a BSS.

19. A radio access node as claimed in claim 15, for use in a GPRS network, wherein the radio access node is a BSS, and the cell change notification is a Packet Cell Change Notification message.

20. A radio access node as claimed in claim 16, for use in a GPRS network, wherein the radio access node is a BSS, the cell change notification is a Packet Cell Change Notification message, and the message sent from the radio access node to the mobile station delaying the cell change directs the mobile station to enter Network Control mode 2.

21. A method as claimed in claim 1, further comprising omitting at least a portion of a higher layer protocol data from the buffered data transmitted from the radio access node to the mobile station.

22. A radio access node associated with a current cell in a mobile communications network, the radio access node comprising:
   a Gb interface unit arranged to communicate with a core network node;
   a Um interface unit arranged to communicate with a mobile station within the current cell;
   a buffer arranged to store data packets received from the core network node via the Gb interface unit and arranged to provide the data packets destined for the mobile station to the Um interface unit for transmission to the mobile station; and
   a determination unit arranged to determine that a cell change for the mobile station from the current cell to a different cell is required;
   wherein the Gb interface unit is arranged—when the determination unit determines that the cell change for the mobile station is required—to send a message to the core network node instructing the core network node not to send any more data for the mobile station to the radio access node, and
   wherein the Um interface unit is arranged—when the determination unit determines that the cell change for the mobile station is required—to continue to transmit the data packets for the mobile station from the buffer, and to send a message to the mobile station instructing the mobile station to perform the cell change when the buffer is empty of the data packets for the mobile station.

23. A radio access node as claimed in claim 22, wherein the determination unit is arranged to determine that the cell change for the mobile station is required based on one or both of measurement reports received from the mobile station and a cell change request received from the mobile station.

24. A radio access node as claimed in claim 22, wherein the Um interface unit is arranged—when the determination unit determines that the cell change for the mobile station is required—to adjust the transmission of the data packets from the buffer so as to reduce a likelihood of a need for data retransmissions as compared to the transmission of the data packets prior to the determination unit determining that the cell change for the mobile station is required.

25. A radio access node as claimed in claim 22,
   wherein the mobile station is an exiting mobile station, the different cell is an exit-to cell, and the cell change is an exit-cell change, and
   wherein when an enter-cell change is effected in which an entering mobile station enters the current cell from an enter-from cell, any one or more of the Gb interface unit, the Um interface unit, and the buffer are arranged to prioritize transmission of data packets for the entering mobile station over data packets for one or more other mobile stations already in the current cell.

26. A radio access node as claimed in claim 25, wherein the prioritization of the data packets for the entering mobile station is continued until an amount of data packets buffered in the core network node for the entering mobile station is reduced to be at or below a predetermined level.

* * * * *